United States Patent
Shahmansoori et al.

(10) Patent No.: US 12,494,947 B2
(45) Date of Patent: Dec. 9, 2025

(54) METHOD, SYSTEM, AND COMPUTER PROGRAM FOR OPTIMIZING A CAPACITY OF A COMMUNICATION CHANNEL USING A DIRICHLET PROCESS

(71) Applicant: MITSUBISHI ELECTRIC CORPORATION, Tokyo (JP)

(72) Inventors: Arash Shahmansoori, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 464 days.

(21) Appl. No.: 17/928,734

(22) PCT Filed: Apr. 16, 2021

(86) PCT No.: PCT/JP2021/016387
§ 371 (c)(1),
(2) Date: Nov. 30, 2022

(87) PCT Pub. No.: WO2021/256085
PCT Pub. Date: Dec. 23, 2021

(65) Prior Publication Data
US 2023/0216708 A1   Jul. 6, 2023

(30) Foreign Application Priority Data
Jun. 19, 2020 (EP) .................................. 20305674

(51) Int. Cl.
*H04L 25/02* (2006.01)
(52) U.S. Cl.
CPC .................. *H04L 25/0202* (2013.01)
(58) Field of Classification Search
CPC .................................... H04L 25/0202
See application file for complete search history.

(56) References Cited

U.S. PATENT DOCUMENTS

7,457,367 B2 * 11/2008 Farhang-Boroujeny ..................... H04B 1/7105
370/252
8,031,814 B2 * 10/2011 Hwang ............... H04L 25/0236
375/349

(Continued)

OTHER PUBLICATIONS

J. Zheng and S. L. Miller, "Performance analysis of coded OFDM systems over frequency-selective fading channels," GLOBECOM '03. IEEE Global Telecommunications Conference (IEEE Cat. No.03CH37489), San Francisco, CA, USA, 2003, pp. 1623-1627 vol. 3 , doi: 10.1109/GLOCOM.2003.1258512. (Year: 2003).*

(Continued)

*Primary Examiner* — Ivan O Latorre
(74) *Attorney, Agent, or Firm* — Birch, Stewart, Kolasch & Birch, LLP

(57) ABSTRACT

The invention relates to a method for optimizing a capacity of a communication channel in a communication system comprising at least a transmitter, a receiver, said communication channel between the transmitter and the receiver, and a channel conditional probability distribution estimator. The transmitter transmits messages conveyed by a signal associated with a transmission probability according to an input signal probability distribution estimated by said estimator. The transmitter takes at least the messages as inputs and outputs the signal to be transmitted on the channel. The channel takes the transmitted signal as an input and outputs a received signal which is processed at the receiver in order to decode the transmitted message. The probability distribution for each possible transmitted signal is estimated from at least output signals received at the receiver, and by using a collapsed Gibbs sampling relying on a Dirichlet process.

14 Claims, 8 Drawing Sheets

(56) References Cited

U.S. PATENT DOCUMENTS

| | | | |
|---|---|---|---|
| 9,559,786 B2* | 1/2017 | Millar | H04L 25/03019 |
| 9,948,415 B2* | 4/2018 | Badiu | H04L 25/0204 |
| 11,929,853 B2* | 3/2024 | Behboodi | G06N 3/084 |
| 2004/0161059 A1* | 8/2004 | Andrieu | H04L 1/06 375/341 |
| 2005/0089112 A1* | 4/2005 | Piechocki | H04L 1/005 375/267 |
| 2007/0076669 A1* | 4/2007 | Boroujeny | H04L 25/067 370/335 |
| 2007/0127728 A1* | 6/2007 | Hong | H04L 1/005 381/18 |
| 2012/0307924 A1* | 12/2012 | Chockalingam | H04L 25/03891 375/260 |
| 2018/0375557 A1* | 12/2018 | Noh | H04B 7/066 |
| 2022/0209891 A1* | 6/2022 | Krishnamurthy | H04L 1/0053 |
| 2023/0216708 A1* | 7/2023 | Shahmansoori | H04L 25/0202 370/465 |
| 2023/0261923 A1* | 8/2023 | Shahmansoori | H04L 1/0001 375/262 |

OTHER PUBLICATIONS

Bkassiny et al., "Multidimensional Dirichlet Process-Based Non-Parametric Signal Classification for Autonomous Self-Learning Cognitive Radios," IEEE Transactions on Wireless Communications, vol. 12, No. 11, Nov. 1, 2013, pp. 5413-5423.

International Search Report (PCT/ISA/210) issued in PCT/JP2021/016387, dated Jul. 7, 2021.

Written Opinion of the International Searching Authority (PCT/ISA/237) issued in PCT/JP2021/016387, dated Jul. 7, 2021.

Yu, Xiaodong, "Gibbs Sampling Methods for Dirichlet Process Mixture Model: Technical Details," University of Maryland, College Park, Sep. 12, 2009, pp. 1-18.

Zhao et al., "Dynamic and Flexible OFDM System Based on Joint Coded Modulation," IEEE, Access, vol. 8, May 20, 2020, pp. 86057-86064.

* cited by examiner

METHOD, SYSTEM, AND COMPUTER PROGRAM FOR OPTIMIZING A CAPACITY OF A COMMUNICATION CHANNEL USING A DIRICHLET PROCESS

TECHNICAL FIELD

The present disclosure relates to optimization of capacity of communication channels and targets and addresses in particular the case of non-trivial channels, where an optimal input distribution cannot be obtained theoretically.

BACKGROUND ART

An essential characteristic of a memoryless communication channel can be represented by the so-called "conditional probability distribution", noted $p_{Y|X}(y|x)$, of the output Y given the input X. Some examples of well-known communication channels are given in the following list:

The additive white Gaussian noise channel, where $Y=X+N$ and N is Gaussian-distributed models a wired communication subject to perturbations caused by thermal noise at the receiver, The fading channel $Y=a \cdot X+N$ where a follows a fading distribution (such as a Rayleigh distribution), models the transmission over a narrow-band wireless channel in a radio propagation environment involving rich scattering, More complicated channels can involve non-linear effects. This is for example the case of optical channels where the Kerr effect cannot be neglected and reduces the channel capacity, which is driven by the Nonlinear Schrödinger equations, when increasing too much the transmit power in Wavelength Division Multiplexing (so-called "WDM transmissions").

Once the conditional probability distribution $p_{Y|X}(y|x)$ is accurately known, it is possible to optimize the communication system relying on The design of the input signal such as to maximize the mutual information between the input and the output of the channel, The design of optimal receivers, which in general rely on the processing of the likelihood probabilities $p_{Y|X}(y|x)$.

The channel conditional probability distribution $p_{Y|X}(y|x)$ is supposed hereafter to have low fluctuations so that a learning and tracking is possible.

In general, wireless communication systems can be modelled by linear systems, parameters of which are estimated by sending training signals. However, when the number of parameters to be tracked is high, a large overhead of pilots is required and reduces the system throughput. Furthermore, when the channel is more sophisticated, defining the model to be tracked is difficult or impossible. The future of wireless communication systems is to continue increasing the carrier frequency in the goal of exploiting available frequency bands. Terahertz communications (above 300 GHz) is one keyword envisioned for new generation telecommunications (6G). However, up to today's knowledge, terahertz communication requires new materials, new radio equipment at the frontier between electronics and photonics. The strong non-linear and random characteristics of these new channels cannot be ignored so as to take the best benefit of these new frequency bands. It is of interest to learn such communication channels instead of relying on inaccurate models.

In order to optimize the transmission strategy, the optimized input distribution must be known in advance at the transmitter. The received signal is used to estimate the channel conditional probability distribution, which in turn is used for optimizing the optimal input distribution, which is finally provided to the transmitter. The compact and accurate representation of channel conditional probability distribution is used in order to limit the overhead on the feedback link when the channel conditional probability distribution is fed back from the receiver to the transmitter, limit the computational complexity of computing the optimal input distribution.

SUMMARY OF INVENTION

A problem lies however on jointly learning the channel conditional probability distribution and optimizing the transmission method accordingly. One of the main challenges is to learn the channel conditional probability distribution when the channel model is unknown. In order to address the widest varieties of channels, an accurate description of the channel is needed, but often leads to high complexity at the receiver. Thus, it would be better to find a compact and accurate representation of channel conditional probability distribution.

The present disclosure aims to improve this situation.

To that end, it is proposed a method for optimizing a capacity of a communication channel in a communication system comprising at least a transmitter (reference 10 of FIG. 1), a receiver (11), said communication channel (12) between the transmitter and the receiver, and a channel conditional probability distribution estimator (13).

The transmitter (10) transmits messages conveyed by a signal associated with a transmission probability according to an input signal probability distribution estimated by said estimator (13).

The transmitter (10) takes at least the messages as inputs and outputs the signal to be transmitted on the channel (12), and the channel takes the transmitted signal as an input and outputs a received signal which is processed at the receiver (11) in order to decode the transmitted message.

The probability distribution, noted $p_{Y|X}(y|x)$, relates to an output Y, corresponding to the received signal, given an input X which corresponds to the transmitted signal X, and represents thus a channel conditional probability distribution of a probability of outputting a received signal Y, when the transmitted signal X is given.

More particularly, the probability distribution is estimated as an approximation of the channel conditional probability distribution $p_{Y|X}(y|x)$ by using a functional basis of probability distributions. The channel conditional probability distribution is thus approximated, for each possible signal sent by the transmitter, by a mixture model with mixing probability distribution from said functional basis. The probability distribution for each possible transmitted signal is estimated from at least output signals received at the receiver, and by using a collapsed Gibbs sampling relying on a Dirichlet process as detailed in the presentation of embodiments below.

The implementation of the present disclosure makes it then possible to reach an accurate representation of the channel conditional probability distribution, and thereby enhances the robustness of the decoding.

The wording according to which the transmitter (10) takes "at least" the messages as inputs, refers to the fact that the transmitter can take also the estimated input signal probability distribution, and more particularly an optimized input signal probability distribution, in an optional embodiment implementing an optimizer (14). So too, the probability distribution for each possible transmitted signal can be estimated from the output signals received at the receiver and also thanks to the optimized input signal probability distribution.

In an embodiment which appears advantageous relatively to calculations to perform, the aforesaid functional basis is chosen in a family of exponential functions. Alternatively, other possible embodiments may use known methods of digital integration.

In an embodiment, the probability distribution estimation is based on an approximation of the channel conditional probability distribution relying on a decomposition into a basis of probability distributions functions $p(y|x; \theta)$, where $\theta$ is a set of parameters $\theta_j$, said distribution function being the exponential family and the parameters are a mean and a variance, such that the approximation of $p_{Y|X}(y|x)$ in said basis of probability distributions functions $p(y|x; \theta)$ is given by $p_{Y|X}(y|x) \cong \Sigma_{j=1}^{N} w_j g(y|x; \theta_j)$, where N, and the sets $\{\theta_j\}$, $\{w_j\}$ are parameters to be estimated.

In this embodiment, the probability distributions functions $g(y|x; \theta)$ being from the exponential distribution family, the prior on $\theta$ can be conjugate to a corresponding exponential distribution with a parameter $\lambda$, with $\lambda = \{\lambda_1, \lambda_2\}$ denoting a hyperparameter for the conjugate prior on the parameter $\lambda$, And the following steps can then be performed:

N clusters are built for parameter sets $\{\theta_j\}$, $\{w_j\}$, each cluster being used to group symbols together, the clusters being implemented by associating an integer index from 1 to N for each group of symbols, a cluster index is assigned for the i-th sample being noted $c_i$ so that $c_{-i}$ is a cluster assignment index for all clusters but the ith, a posterior distribution $p(c_i = k|x_{1:n}, y_{1:n}, c_{-i}, \lambda)$ is computed where $x_{1:n}$ represents the symbols of the transmitted signal and $y_{1:n}$ represents the input symbols of the received signal, and a sampling from the posterior distribution is performed in order to update parameters $\{\theta_j\}$, $\{w_j\}$, the parameters N, $\{\theta_j\}$, $\{w_j\}$ being thus estimated to provide the approximation of the channel conditional probability distribution $p_{Y|X}(y|x) \cong \Sigma_{j=1}^{N} w_j g(y|x; \theta_j)$.

In this embodiment, the updated parameters $\{\theta_j\}$, $\{w_j\}$ can be sent to the transmitter and/or to the receiver so as to compute said conditional probability distribution estimation. The signalization obtained at the receiver and/or at the transmitter can then be enhanced with such updated parameters. In this embodiment then, the transmitter can improve the accuracy of its knowledge of the conditional probability distribution and thereby optimize more efficiently its transmission strategy. On the receiver side, the improved accuracy of the knowledge of the conditional probability distribution can be used to improve its decoding performance.

In an embodiment, the posterior distribution $p(c_i = k|x_{1:n}, y_{1:n}, c_{-i}, \lambda)$ can be given by:

$$p(c_i = k|x_{1:n}, y_{1:n}, c_{-i}, \lambda) = P(c_i = k|c_{-i})$$
$$p(y_i|x_{1:i-1}, x_{i+1:n}, y_{1:i-1}, y_{i+1:n}, c_{-i}, c_i = k, \lambda), \text{ where:}$$

$p(c_i = k|c_{-i})$ is computed according to a Polya urn scheme, and $p(y_i|x_{1:i-1}, x_{i+1:n}, y_{1:i-1}, y_{i+1:n}, c_{-i}, c_i = k, \lambda) = \int p(y_i|x_i, \theta) P(\theta|x_{1:i-1}, x_{i+1:n}, y_{1:i-1}, y_{i+1:n}, c_{-i}, c_i = k, \lambda) d\theta$ In this embodiment, it can be furthermore checked whether a new cluster is to be created so as to determine a best value of parameter N, providing an optimum approximation of the channel conditional probability distribution.

In this embodiment, it can be randomly chosen to create a new cluster from a probability verifying:

$$p(y_i|x_i, P_0) = \int p(y_i|x_i, \theta) dP_0, \text{ where } P_0 \text{ is the conjugate to } p(y|x; \theta)$$

In a first embodiment and in a second embodiment, a transmitted message is conveyed by a signal which belongs to a finite set of signals, and this set of signals is represented by a set of possible respective symbols x. In the first embodiment, the transmitted symbols x are known at the receiver in a "training mode", while in the second embodiment they are not known.

Therefore, in the first embodiment, the method can be applied for only one predefined value of the input X, this input X being known, and the associated output Y is considered only when the input X equals said predefined value.

In a third embodiment and in a fourth embodiment, the transmitted message is conveyed by a signal which does not necessary belong to a finite set of signals. The third embodiment corresponds however to the situation where the input X is known, while the fourth embodiment corresponds to the situation where the input X is not known and the transmitted signal does not belong to a known finite set of signals.

Therefore, the second and fourth embodiments where the input X is not known are related to a tracking mode. In this tracking mode, an input signal probability distribution $p_X(x)$ is taken into account for the channel conditional probability distribution estimation. A value of a transmitted symbol x can be inferred with a Bayesian approach so that each observation y contributes to an update of $p_{Y|X}(y|x)$ with a weight corresponding to the probability of y being associated to x, from a current estimation on the condition probability distribution.

It should be noted that in the aforesaid second embodiment, the input signal probability distribution $p_X(x)$ becomes simply a scalar (a probability value), and $p_{Y|X}(y|x)$ becomes $p_{Y|X}(y|x = \theta_m)$ with a weight corresponding to the probability of y being associated to $x = \omega_m$.

It should be noted also that, in the first and second embodiments, the output Y can be selected on the basis of the set of possible inputs X, before building the N clusters for parameter sets $\{\theta_j\}$, $\{w_j\}$. Furthermore, the input X can be known typically in the first embodiment, leading thus to a high reduction of complexity when the first embodiment is implemented.

Otherwise, when the input X is not known and when it does not even belong to a finite known set of symbols (or signals), typically in the fourth embodiment, a model for non-parametric joint density can be defined however as:

$$p(y,x) = \Sigma_{j=1}^{N} w_j g(y|x, \theta_j) p(x|\psi_j)), \text{ where:} \quad (21)$$

parameters $\{\theta_j\}$, $\{w_j\}$, and $\{\psi_j\}$ denote conditional density parameters, and j being a cluster index, the parameters $(\theta, \psi)$ being jointly obtained from a base measure of Dirichlet Process "DP" such that $(\theta, \psi) \sim DP(\alpha P_{0\theta} \times P_{0\psi})$ where a is a scaling parameter.

According to the option related to the optimization computation presented above, the set of signals being represented by a set of respective symbols, parameters of said mixture model are optimized for defining optimized symbols positions and probabilities to be used at the transmitter, in order to optimize the capacity of the approximated channel, the optimized symbols positions and probabilities being then provided to the receiver and/or to the transmitter.

The input signal distribution optimizer (reference 14 of FIG. 1) relies then on the estimation of the channel probability distribution, performed as explained above. When the functional basis chosen for the estimation of the channel is the exponential family, closed form expression can be derived and the algorithm converges to the optimal solution. The optimized $p_X(x)$ delivered by the optimizer 14 can be then distributed to the estimator 13 (as well as the transmitter 10 and/or the receiver 11).

The present disclosure aims also at a system comprising at least a transmitter (10), a receiver (11), a communication channel (12) between the transmitter and the receiver, and a channel conditional probability distribution estimator (13) for implementing the method above. In this system, the estimator:

Obtains information relative to the transmitted signal (x; $p_X(x)$) used at the transmitter;

Receives a signal y transmitted through the channel and characterized by a channel conditional probability distribution $p_{Y|X}(y|x)$;

Estimates a channel conditional probability distribution from the received signal, the channel conditional probability distribution being approximated by a model of distributions relying on a basis of functions;

Sends the estimated channel conditional probability distribution to the receiver and/or to the transmitter.

The system can furthermore comprise an input signal probability distribution optimizer (14) for performing the method implementing the optimization. Here, the input signal distribution optimizer (14):

Obtains the estimated channel conditional probability distribution $p_{Y|X}(y|x)$ Optimizes the input distribution $p_X(x)$ Sends the optimized input signal distribution to the transmitter (10), to the receiver (11) and/or to the channel conditional probability distribution estimator (13).

The present disclosure aims also at a computer program comprising instructions for implementing the method as presented above, when such instructions are executed by a processor. The instructions of the program can be distributed over the receiver, the transmitter, the estimator and optionally to the optimizer.

BRIEF DESCRIPTION OF DRAWINGS

More details and advantages of the invention will be understood when reading the following description of embodiments given below as examples, and will appear from the related drawings where.

DESCRIPTION OF EMBODIMENTS

Figure 1:
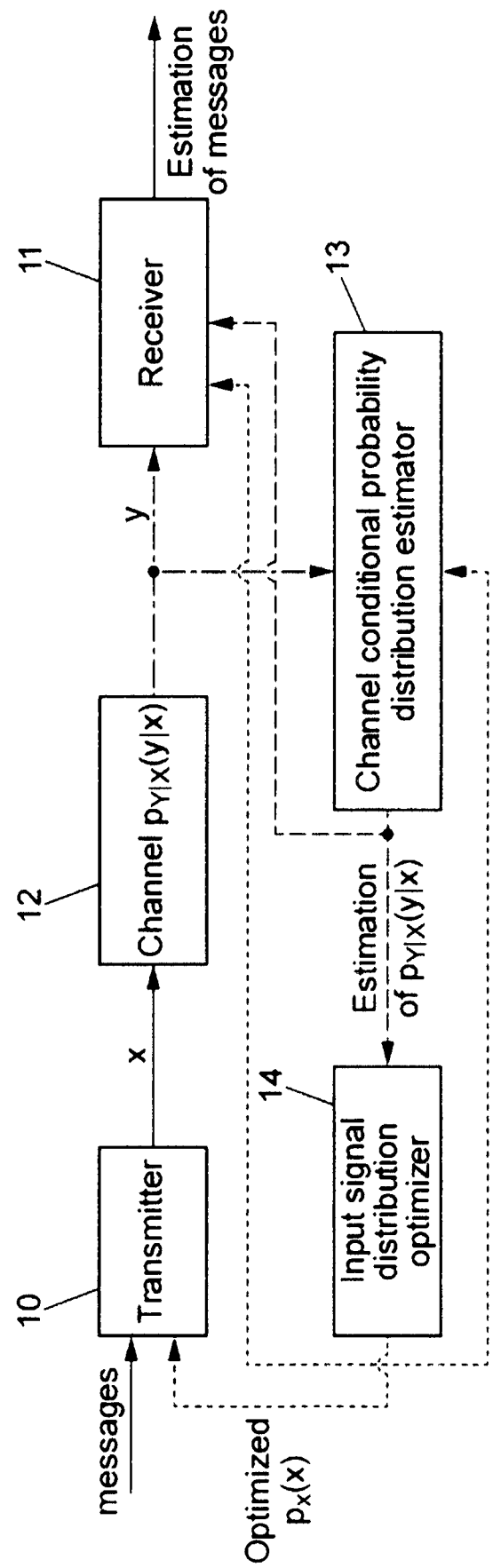
FIG. 1 shows an overview of a general system according to an example of implementation.

It is described hereafter a context of the present disclosure where, in addition to the estimation of the channel conditional probability distribution, an optimization of the channel conditional probability distribution is furthermore performed according to an optional embodiment. These two steps (estimation and optimization) can then rely either on the knowledge of the input signal, or of its probability distribution, or simply without any knowledge on the input signal (performing then a so-called blind "tracking" phase).

Thus, the input signal probability distribution is to be shared with the transmitter, so as to optimize the channel capacity. The input signal probability distribution is to be shared with the receiver, so as to optimize the receiver's performance. The input signal probability distribution is to be shared with the channel conditional probability distribution estimator, so as to improve the channel conditional probability distribution estimation performance.

By improving the input signal probability distribution according to the channel knowledge, the channel capacity is improved, which further allows to improve the channel conditional probability distribution estimation, and so on. Thus, an iterative approach of jointly optimizing the channel conditional probability distribution estimation and input signal probability distribution is preferred. Another advantage of this approach is to allow tracking the changes of the input signal probability distribution, as their variation speed is not too high.

The channel conditional probability distribution estimator can implement an approximation of the channel conditional probability distribution $p_{Y|X}(y|x)$ by using a functional basis of probability distributions which is preferably of the exponential functions family. Indeed, it is shown below that specific calculations are easier to manipulate with such exponential functions.

As a general approach, a transmitter uses a finite set of symbols on a communication channel characterized by a conditional probability distribution. The conditional probability distribution can be approximated, for each possible symbol sent by the transmitter, by a mixture model with mixing probability distribution from the exponential family. The conditional probability distribution for each possible transmitted symbol of the finite set of symbols is estimated from at least output symbols, and using a collapsed Gibbs sampling relying on Dirichlet process. The result is in the form of mixture model and the number of components is learnt directly from the observation. The exponential family makes it possible to get simpler implementation of the Gibbs sampling.

The conditional probability distribution estimation is preferably computed at the receiver.

In a first embodiment, called "training mode", it is considered that the symbols x are known at the receiver.

In a second embodiment, called "tracking mode", the symbols x are unknown at the receiver. However, it is considered that the input signal probability distribution $p_X(x)$ is known and taken into account during the conditional probability distribution estimation step.

The two embodiments can be interleaved in time according to the cases where pilot symbols are sent, or when data has been correctly decoded and can be used as pilots signal for the channel estimation and approximation, or when data has not been correctly decoded.

In addition, the parameters of the mixture model as estimated by the conditional probability distribution estimator can be provided to an input distribution optimizer (according to the aforesaid optional embodiment) that defines optimized symbols positions and probabilities to be used at the transmitter for optimizing the capacity of the approximated channel. The optimized symbols positions and probabilities are then provided to the transmitter and receiver.

Referring to FIG. 1, a system according to a possible embodiment includes a transmitter 10, a receiver 11, a transmission channel 12, a channel conditional probability distribution estimator 13 and optionally an input signal probability distribution optimizer 14. The transmitter 10 transmits messages conveyed by a signal belonging to a finite set of signals, each associated with a transmission probability according to the (estimated or optionally optimized) input signal probability distribution. The transmitter 10 takes the messages and optionally the estimated (or optionally optimized) input signal probability distribution as inputs and outputs the signal to be transmitted on the channel 12. The channel 12 is taking the transmitted signal as an input and outputs a received signal which is processed at the receiver 11 in order to decode the transmitted message.

A channel conditional probability distribution of the probability of outputting a given signal, when the input is fixed, is computed. The probability distribution can generally be defined on a discrete or continuous input and/or output alphabet. It is preferably considered the continuous output alphabet, and the probability distribution is called a "probability density function" in this case.

The channel conditional probability distribution estimator 13 takes the received signal and the input signal or its estimated (or optionally optimized) probability distribution as inputs and outputs the channel conditional probability distribution. It is located preferably in the receiver 11, in the transmitter 10, or in an external computing device.

The input signal probability distribution optimizer 14 can take then the conditional probability distribution estimation as an input and outputs the optimized input signal probability distribution to the transmitter 10 and receiver 11, here. The conditional probability distribution estimation can be then used in this embodiment for computing the optimized input signal probability distribution at the input signal probability distribution optimizer 14. Furthermore, it is shown below that the optimization can be made more efficient when the conditional probability distribution estimation is approximated by a mixture of exponential distributions.

The receiver 11 takes the received signal, the optimized input signal probability distribution and the estimated channel conditional probability distribution as inputs and performs an estimation of the message conveyed in the received signal.

Figure 2:
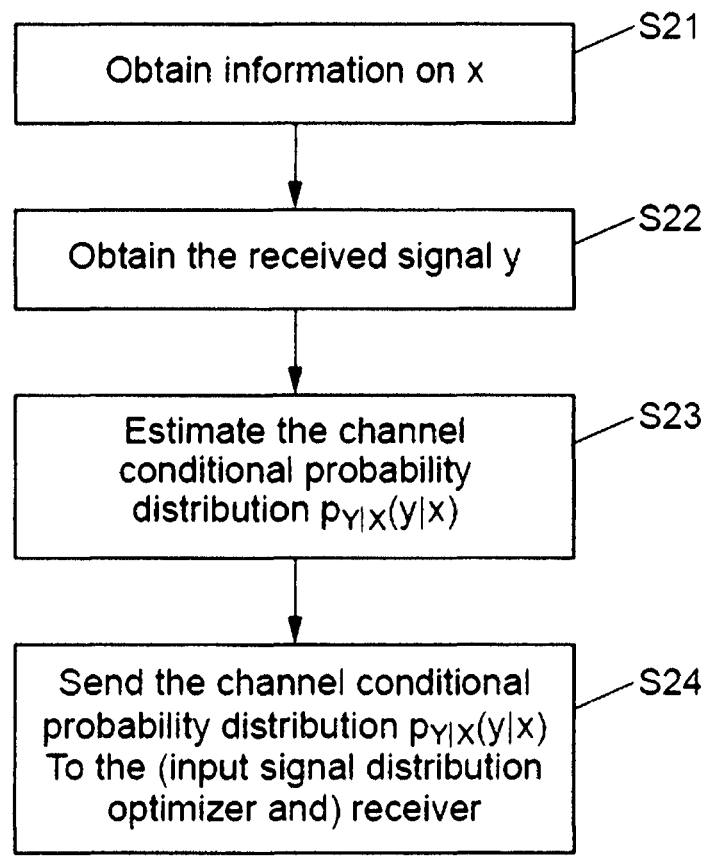
FIG. 2 shows steps implemented by the conditional probability distribution estimator 13 illustrated in FIG. 1, as an example of embodiment.

In this example of embodiment, the conditional probability distribution estimator 13 implements preferably the following steps as illustrated in FIG. 2:

S21: Obtaining information relative to the transmitted symbols x, such as the symbols x themselves or the input signal distribution $p_X(x)$ used at the transmitter 10.
  The input signal distribution $p_X(x)$ can be provided by the input signal distribution optimizer, or
  The input signal distribution $p_X(x)$ can be arbitrarily fixed by the transmitter (as presented in an embodiment below);

S22: Receiving a signal y transmitted through a channel characterized by channel conditional probability distribution $p_{Y|X}(y|x)$.
  The channel conditional probability distribution $p_{Y|X}(y|x)$ can be known, or
  The channel conditional probability distribution $p_{Y|X}(y|x)$ is unknown;

S23: Estimating the channel conditional probability distribution, when it is unknown, from the received signal, the channel conditional probability distribution being approximated by a model of exponential distributions presented in details below;

S24: Sending the estimated channel conditional probability distribution to the input signal distribution optimizer 14 (as a preferred embodiment) and to the receiver 11.

Figure 3:
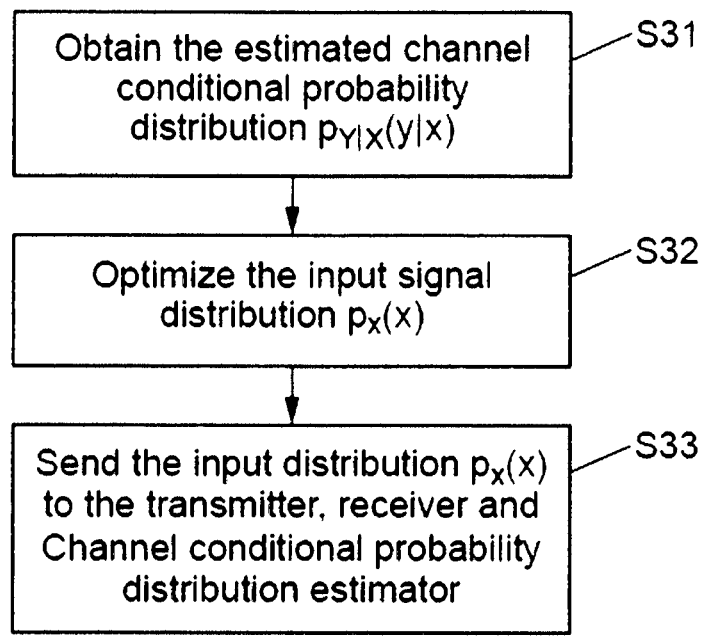
FIG. 3 shows steps implemented by the input signal distribution optimizer 14 illustrated in FIG. 1, as an example of optional embodiment.

The input signal distribution optimizer 14 can implement in an exemplary embodiment the steps illustrated in FIG. 3, of:

S31: Obtaining the estimated channel conditional probability distribution $p_{Y|X}(y|x)$ S32: Optimizing the input distribution $p_X(x)$ S33: Sending the optimized input signal distribution to the transmitter 10, receiver 11 and channel conditional probability distribution estimator 13.

Figure 4:
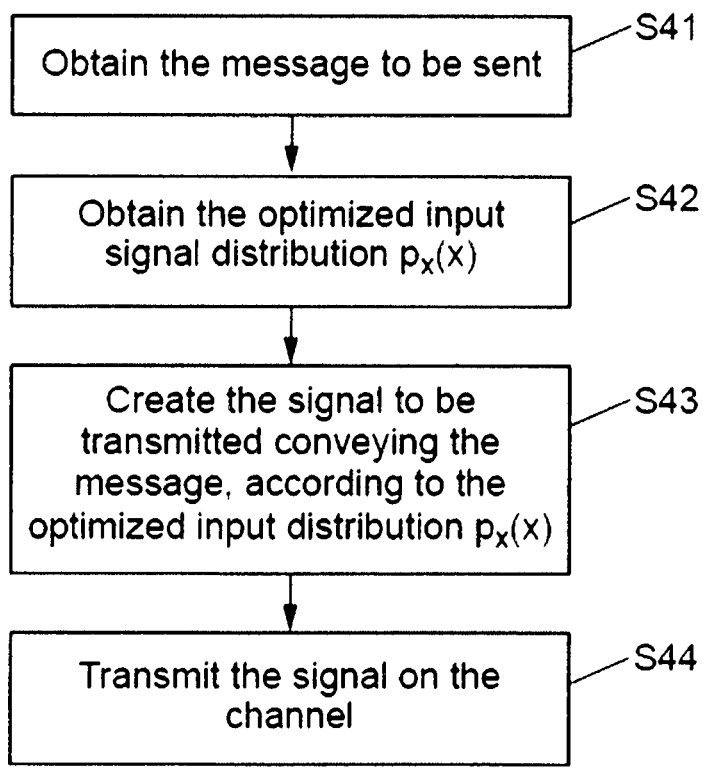
FIG. 4 shows steps implemented by the transmitter 10 illustrated in FIG. 1, as an example of embodiment.

The transmitter 10 preferably implements the steps illustrated in FIG. 4, of:

S41: Obtaining the message to be sent

S42: Obtaining the optimized input signal distribution $p_X(x)$

S43: Creating the signal to be transmitted, which conveys the message, according to the optimized input signal distribution $p_X(x)$. This can be done by using techniques of prior art, usually involving a distribution matcher and a coded modulation such as:

LDPC (for "Low Density Parity Check") as disclosed for example in: G. Bocherer, F. Steiner, and P. Schulte, "*Bandwidth efficient andrate-matched low-density parity-check coded modulation*" IEEE Trans. Commun., vol. 63, no. 12, pp. 4651-4665, December 2015, or Polar Codes as disclosed for example in:

T. Prinz, P. Yuan, G. Bocherer, F. Steiner, O. iscan, R. Bohnke, W. Xu, "*Polar coded probabilistic amplitude shaping for short packets*" Int. workshop. On Signal Processing Advances in Wireless Communications (SPAWC), pp. 1-5, July 2017, S44: And transmitting the signal on the channel 12.

Figure 5:
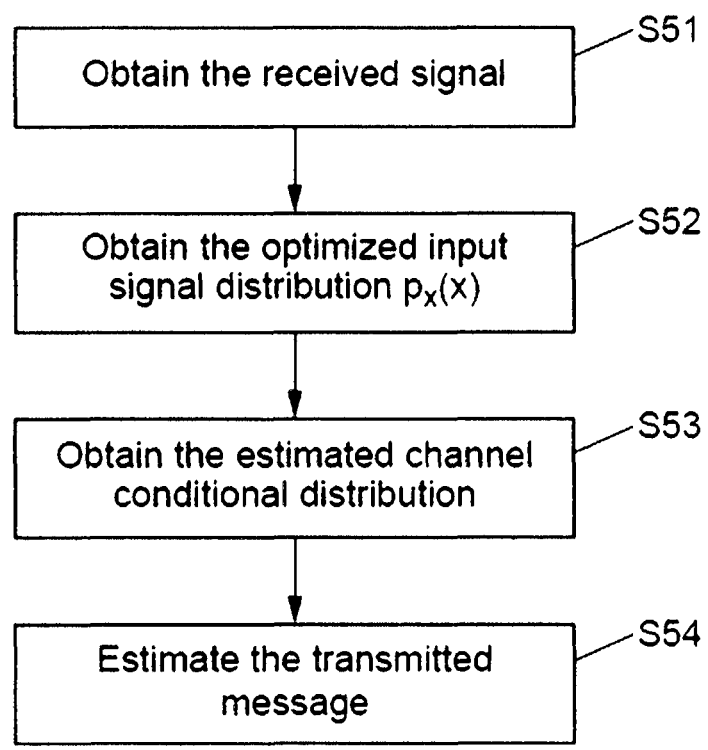
FIG. 5 shows steps implemented by the receiver 11 illustrated in FIG. 1, as an example of embodiment.

The receiver 11 can implement the steps illustrated in FIG. 5, of:

S51: Obtaining the received signal y

S52: Obtaining the optimized input signal distribution $p_X(x)$

S53: Obtaining the estimated channel conditional probability distribution $p_{Y|X}(y|x)$ S54: Estimate the transmitted message.

The purpose of the conditional probability distribution estimator 13 is to estimate the distribution $p_{Y|X}(y|x)$ based on an approximation of the channel probability distribution relying on a decomposition into a basis of probability distributions functions g(y|x; θ), where θ is a parameter set. The distribution function is the exponential family and the parameters are essentially the mean and variance for the scalar case, and more generally the mean vector and covariance matrix for the multivariate case. For an example, the parameter set θ may contain the mean vector and covariance matrix of a so-called "multivariate normal distribution". In another example, it may contain the shape parameter and spread parameter of a Nakagami distribution.

In general the considered functions g(y|x; θ) are written in the form $$g(y|x;\theta)=h(y,\theta)\exp(x^T y - a(x,\theta)),$$

where x, h(y, θ) is a function of y and θ, and a(x, θ) is the moment generating function. (x and y are vectors in this general case).

The conjugate prior for the above exponential model is of the form of:

$$g(\theta|\lambda)=g'(\theta)\exp(\lambda_1^T \theta - \lambda_2 a(\theta) - b(\lambda_1, \lambda_2)),$$

in which $\lambda=\{\lambda_1, \lambda_2\}$, g'(θ) is a scalar function of θ, parameter $\lambda_1$ has the same dimension as θ and $\lambda_2$ is a scalar, and $b(\lambda_1, \lambda_2)$ is the moment generating function of the prior chosen such that the prior integrates to one.

Thus, the objective of the conditional probability distribution estimator 13 is to find the best approximation of $p_{Y|X}(y|x)$ in the aforementioned basis:

$$p_{Y|X}(y|x) \cong \sum_{j=1}^{N} w_j g(y|x;\theta_j)$$

where N, and the sets $\{\theta_j\}$, $\{w_j\}$ are parameters to be estimated. The weights $w_j$ are scalar parameters.

The function $p_{Y|X}(y|x)$ is bivariate with variables x and y which span in general in a continuous domain.

In a first case, it is assumed that the symbols x belong to a finite alphabet $\Omega=\{\omega_1, \ldots, \omega_M\}$ of cardinality M, which is especially fixed and known. In a first embodiment according to the "training mode", the symbols x are known at the receiver. In a second embodiment according to the "tracking mode", the symbols x are unknown at the receiver but the input signal probability distribution $p_X(x)$ is known.

In a second case, the symbols x might belong to a finite set of signals, but this set is not especially fixed, nor known. In a third embodiment according to the "training mode", the symbols x are known at the receiver. In a fourth embodiment according to the "tracking mode", the symbols x are unknown.

In the first case (common to the first and second embodiments above), the conditional probability distribution is fully characterized by $$p_{Y|X}(y|x) = \sum_{m=1}^{M} p_{Y|X}(y|x=\omega_m) p_X(x=\omega_m)$$

where $p_X(x=\omega_m)$ is null everywhere except in $\omega_m$, where the value is equal to the probability that the symbol om, is transmitted. Thus, it is sought to approximate the M functions $p_{Y|X}(y|x=\omega_m)$ of only y for the M possible values of x.

This can be done in parallel by using M estimators, as it will be stated below.

Thus, it is now considered the following approximation:

$$p_{Y|X}(y|x=\omega_m) \cong \sum_{j=1}^{N_m} w_{m,j} g(y|\theta_{m,j}) \quad (1)$$

Here, each transition depends on the transmitted symbol (M possibility with M the cardinality of the known set of symbols in the first case shared by the first and second embodiments).

Solving this estimation problem of equation (1) is in general difficult. Indeed, the number $N_m$ providing the best approximation is unknown, which makes difficult the use of deterministic methods, such as the expectation maximization algorithm.

Several embodiments are possible for the conditional probability distribution estimation and differ according to assumptions on the knowledge of x or its statistics.

Embodiments are described below especially for the conditional probability distribution estimation performed by the estimator 13. As will be apparent below, these embodiments do not need necessarily any optimizer 14 (which is optional as indicated above).

Figure 6:
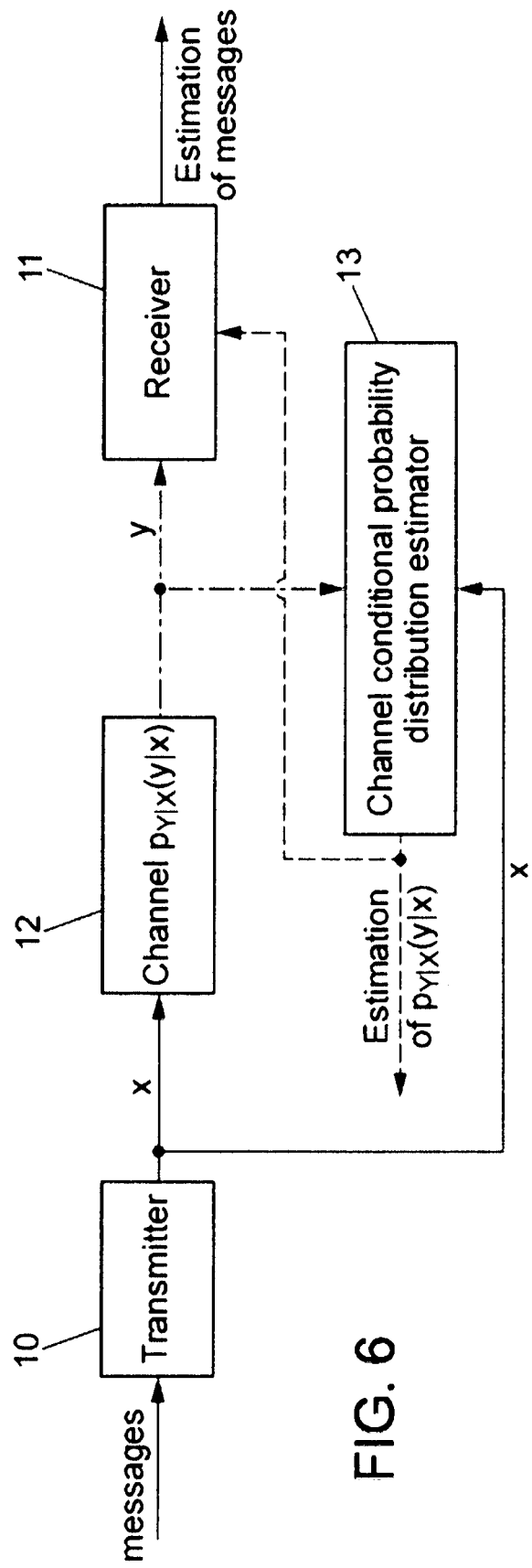
FIG. 6 illustrates estimation of the channel probability distribution at the receiver from y and x (without the optimizer 14).

In the first embodiment related to the "training mode", it is assumed that the symbols x sent by the transmitter are known at the conditional probability distribution estimator 13. These symbols are used as pilot symbols in order to learn the best approximation as shown in FIG. 6.

In this first embodiment related to the training mode, as well as in a second embodiment related to a tracking mode detailed below, the optimizer 14 is not necessary, and the estimation of $p_{Y|X}(y|x)$ is finally needed at the receiver 11 only.

The training mode is activated at the transmitter 10 on given time/frequency resource known at the receiver 11, which also knows the sent message or equivalently x. Therefore, referring to FIG. 6, symbols x are provided especially to the estimator 13. Typically, the knowledge of x can also be obtained at the receiver after a correct decoding (data-aided training). This is made possible by checking the correctness of the decoded message through for example a Cyclic Redundancy Check.

When x is perfectly known at the receiver, solving equation (1) can be achieved by using the method described based on Gibbs sampling as disclosed for example in NEAL00: Neal, Radford M. "Markov chain sampling methods for Dirichlet process mixture models." Journal of computational and graphical statistics 9.2 (2000): 249-265.

It provides a computational efficient and high performance solution, especially when the probability distributions functions $g(y|x=\omega_m; \theta)$ belong to the exponential family. Gibbs sampling is a randomized algorithm, i.e., it uses generated random values to perform an approximation of a statistical inference instead of relying on a deterministic approach. In general, this involves an iterative approach. Using sampling allows reducing the complexity by manipulating a finite number of elements instead of continuous functions. Using Gibbs sampling in particular allows to efficiently manipulate complicated multivariate functions representing the multivariate probability distribution used in the statistical inference methods. Thus, the main principle for performing the estimation in (1) is to sample (i.e., obtain representative samples) from the posterior distribution on the parameters $\{\theta_{m,j}\}$, $\{w_{m,j}\}$ knowing observation samples y. In particular, a Dirichlet process can be used as the prior probability distribution in infinite mixture models. It is a distribution over the possible parameters of a multinomial distribution and has the advantageous property to be the conjugate prior of the multinomial distribution. This property helps in simplifying some steps of the Gibbs sampling. Furthermore, it is known to lead to few dominant components. Thus, by finding these $N_m$ dominant components, the approximation is compact and accurate.

Some adaptation is needed to use the teaching of NEAL00 to the present context. x is assumed to belong to a finite alphabet which is known at the receiver. Each observation $y_i$ is associated to a given symbol $x_i$ out of M possible values of x, and feeds one out of M parallel estimators according to the value of $x_i$ (the estimators are then one out of the three estimators described in [NEAL00]). Finally, M functions $p_{Y|X}(y|x=\omega_m)$ are obtained out of the M estimators. In particular, the parameters $N_m$, $\{\theta_{m,j}\}$, $\{w_{m,j}\}$ are the output of each estimator and allow to characterize the M functions $p_{Y|X}(y|x=\omega_m)$.

Figure 7:
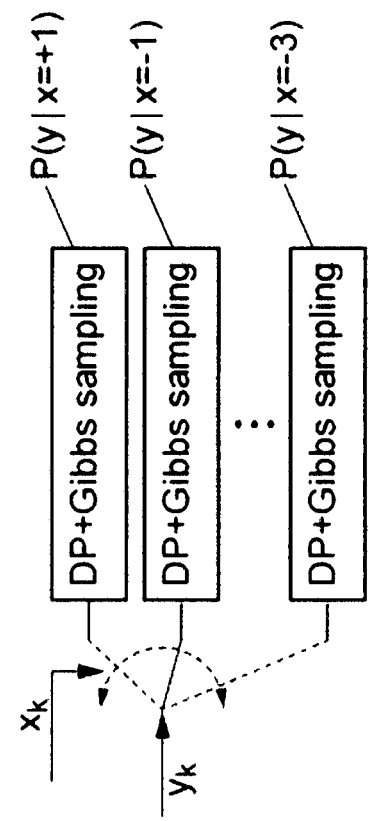
FIG. 7 shows an example of implementation of a Dirichlet process and Gibbs sampling for x belonging to {+1, −1, . . . , −3}.
Figure 8:
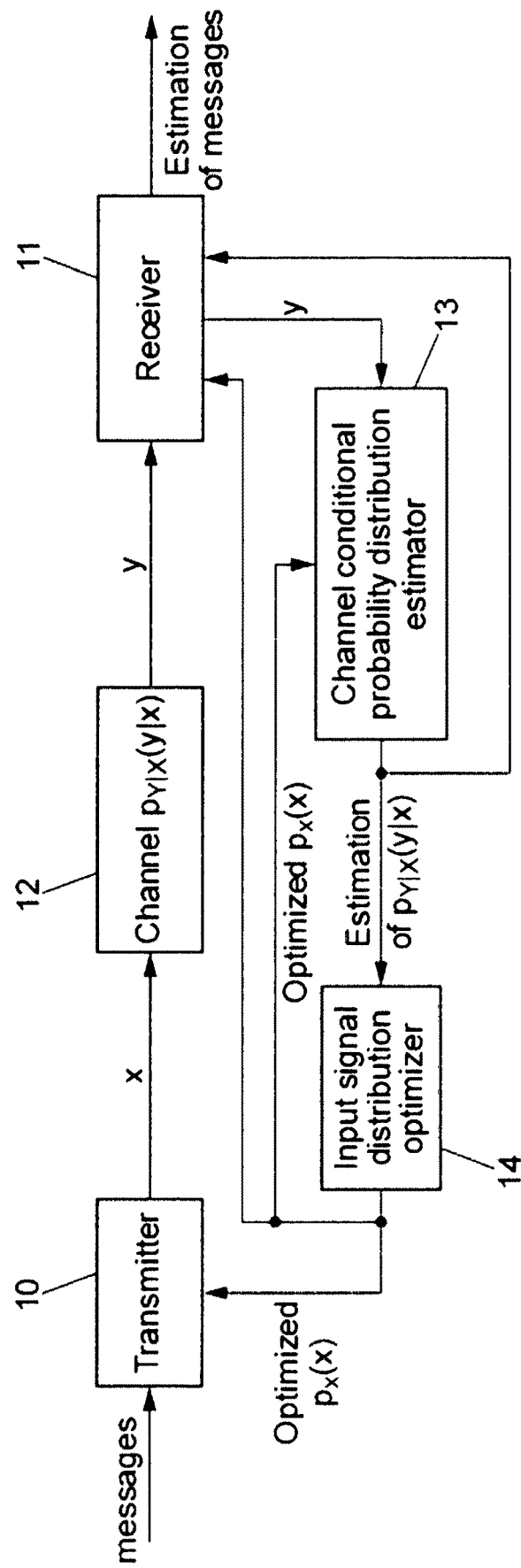
FIG. 8 shows a system according to an optional embodiment of the invention involving an input optimizer 14.

FIG. 7 is a visual example of implementation where x belongs here to $\{+1, -1, \ldots, -3\}$.

Details of an example of embodiment are given below relatively to the training mode, as shown on FIG. 11. In the first embodiment, it is possible to select only the received signals y when they are associated with a transmitted symbol x such as $x=\omega_m$.

The conditional probability distribution estimation is based on an approximation of the channel probability distribution relying on a decomposition into a basis of probability distributions functions $g(y|\theta_{m,j})$, where $\theta_{m,j}$ is a parameter set, in step S10. The distribution function is the exponential family and the parameters are essentially the mean and variance for the scalar case, and more generally the mean vector and covariance matrix for the multivariate case.

In step S11, the conditional probability distribution estimator can find the best approximation of $p_{Y|X}(y|x=\omega_m)$ in the aforementioned basis $$p_{Y|X}(y|x=\omega_m) \approx \sum_{j=1}^{N_m} w_{m,j} g(y|\theta_{m,j})$$

where $N_m$, and the sets $\{\theta_{m,j}\}$, $\{w_{m,j}\}$ are parameters to be estimated in step S12.

Solving this estimation problem is in general difficult. Indeed, the number $N_m$ providing the best approximation is unknown, which makes difficult the use of deterministic methods, such as the expectation maximization algorithm.

However, the use of clusters described below with reference to steps S121 to S124 of FIG. 11 and more generally the method described in NEAL00 based on Gibbs sampling provides a computational efficient and high performance solution, especially when the probability distributions functions $g(y|x=\omega_m; \theta_{m,j})$ belong to the exponential family. Gibbs sampling is a randomized algorithm: it uses generated random values to perform an approximation of a statistical inference instead of relying on a deterministic approach. In general, this involves an iterative approach.

Using sampling allows reducing the complexity by manipulating a finite number of elements instead of continuous functions. Using Gibbs sampling in particular allows managing efficiently complicated multivariate functions representing the multivariate probability distribution used in the statistical inference methods. Thus, the main principle for performing the estimation in (1) is to sample (i.e., obtain representative samples) from the posterior distribution on the parameters $\{\theta_{m,j}\}$, $\{w_{m,j}\}$ knowing observation samples y at the input of the m-th estimators, i.e., after selection of the observed symbols y associated to a transmitted symbol $x=\omega_m$, as known by the receiver, i.e., for time slots where it is known that the transmitted symbol $x=\omega_m$, the observed symbol feeds the m-th estimator.

In particular, a Dirichlet process can be used as the prior probability distribution in infinite mixture models. It is a distribution over the possible parameters of a multinomial distribution and has the property to the conjugate prior for the multinomial (this helps in simplifying some steps of the Gibbs sampling, as explained in [NEAL00]). Furthermore, it is known to lead to few dominant components. Thus, by finding these $N_m$ dominant components, the approximation is compact and accurate.

In order to determine these components in a tractable way, Monte Carlo methods can be applied (and more specifically Markov chain Monte Carlo), allowing to draw samples from probability distributions. More specifically, Gibbs sampling provide a relevant class of algorithms to implement the present disclosure. The Gibbs sampling method in general involves a numerical integration step, which is computational demanding. Fortunately, when the probability distributions functions $g(y|x; \theta)$ are conjugate prior distributions (which is the case for the exponential family), the integration can be performed in a closed form expression which significantly reduced the computation complexity. Since $p_{Y|X}(y|x=\omega_m)$ is a weighted sum of $g(y|x; \theta)$ functions, its conjugate priori is also known and computed efficiently. At the output of the Gibbs sampling, the value $N_m$, and the sets $\{\theta_{m,j}\}$, $\{w_{m,j}\}$, are estimated as shown as a general step S12 of FIG. 11.

Figure 11:
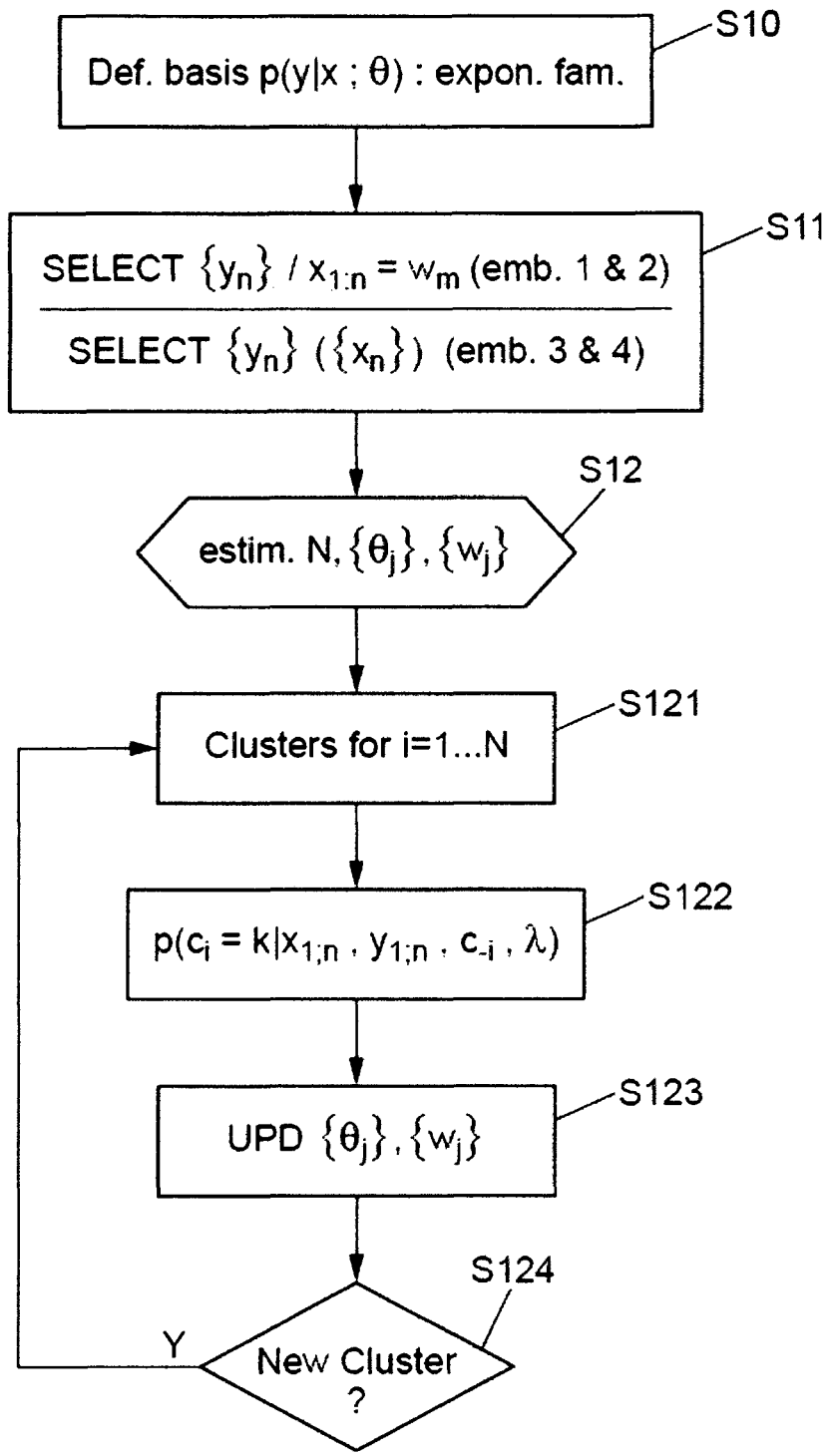
FIG. 11 shows details of the steps which can be implemented to estimate the channel probability distribution, and can represent thus an example of an algorithm of a possible computer program according to the present disclosure.

In the present case, the collapsed Gibbs sampling of [NEAL00] is used in a particular embodiment shown in FIG. 11 and is applied in the particular case for the m-th estimator by:

In step S10, considering a base $g(y|\theta)$ to be from the exponential distribution family.

This allows considering the prior on $\theta$ to be conjugate to the exponential distribution with the parameter $\lambda$. This is a mathematical trick that allows to have closed form expressions for the following steps.

$\lambda=\{\lambda_1, \lambda_2\}$ denotes the hyperparameter for the conjugate prior on the parameter.

In step S11, a selection is performed of the observed symbols $\{y_n\}$ associated to the transmitted symbol $x=\omega_m$, where $y_n$ is n-th out of the selected observed symbols. The expression $x_{1:n}=\omega_m$ denotes the fact that all transmitted symbols considered here are the same and equal to $\omega_m$.

Then, the general step S12 can be decomposed into sub-steps S121 to S124, as follows:

In step S121, considering $N_m$ clusters for the parameter sets $\{\theta_{m,j}\}$, $\{w_{m,j}\}$:

A cluster is used to group received symbols together. The clusters are implemented by associating an integer index from 1 to $N_m$ for each group of symbols, as described below. This cluster assignment approach can be justified by the fact that each received symbol is more likely associated to one out of the N modes composing $p_{Y|X}(y|x=\omega_m)$ in (1)

The cluster assignment index for the i-th observed symbol is $c_i$.

Let $c_{-i}$ be the cluster assignment index for all clusters but the ith.

In step S122, computing the posterior distribution $p(c_i=k|y_{1:n}, c_{-i}, \lambda, x_{1:n}=\omega_m)$, where $y_{1:n}$ represents the input symbols of the received signal Y, under the assumption that the transmitted symbol is $\omega_m$. It can be shown that $$p(c_i=k|y_{1:n},c_{-i},\lambda,x_{1:n}=\omega_m) \approx p(c_i=k|c_{-i})$$
$$p(y_i|y_{1:i-1},y_{i+1:n},c_{-i},c_i=k,\lambda,x_{1:n}=\omega_m)$$

$p(c_i=k|c_{-i})$ is for example computed thanks to a Polya urn scheme $p(y_i|y_{1:i-1}, y_{i+1:n}, c_{-i}, c_i=k, \lambda, x_{1:n}=\omega_m) = \int p(y_i|x_i=\omega_m, \theta) p(\theta|y_{1:i-1}, y_{i+1:n}, c_{-i}, c_i=k, \lambda, x_{1:n}=\omega_m) d\theta$ which is computable because $p(y_i|x_i=\omega_m, \theta)$ is following the approximation $\Sigma_{j=1}^{N_m} w_{m,j} g(y|\theta_{m,j})$ in which $g(y|\theta)$ is from the exponential distribution family, which involves that the conjugate prior is known.

In step S123, sampling from the posterior distribution is performed in order to update the parameters $\{\theta_{m,j}\}$, $\{w_{m,j}\}$.

It is also preferable to check if a new cluster must be created. This is helpful to determine the best value of $N_m$ that provides the best approximation of the channel conditional probability distribution. This is done in step S124, by first starting a new cluster, which is defined as $$p(y_i|x_i=\omega_m, P_0) = \int p(y_i|x_i=\omega_m, \theta) dP_0,$$

where $P_0$ is the conjugate to the $p(y|x=\omega_m; \theta_{m,j})$ (with parameter $\lambda$). Then it is randomly chosen to create a new cluster from this probability. Therefore, it is randomly chosen to create a new cluster from a probability verifying that probability.

At the output of this procedure, the parameters $N_m$, $\{\theta_{m,j}\}$, $\{w_{m,j}\}$ are estimated and provide the approximation of the channel conditional probability distribution $p_{Y|X}(y|x=\omega_m)$ from (1). This procedure is repeated or performed in parallel for the M estimators.

Figure 9:
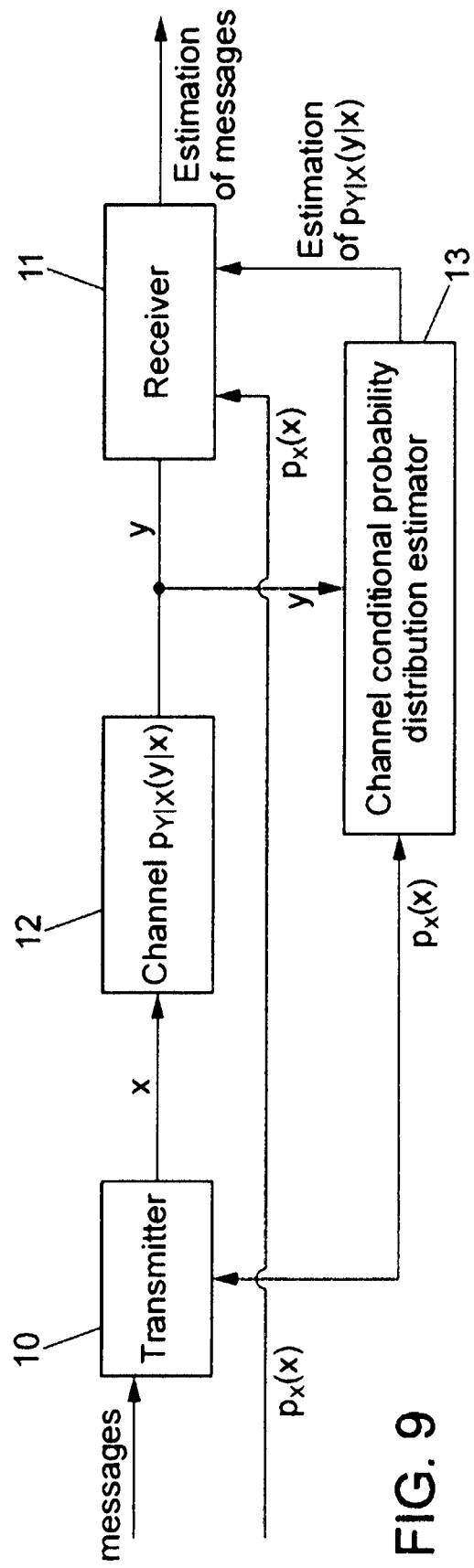
FIG. 9 shows an implementation to estimate the channel probability distribution at the receiver from y and the input signal distribution $p_X(x)$ optimization.
Figure 10:
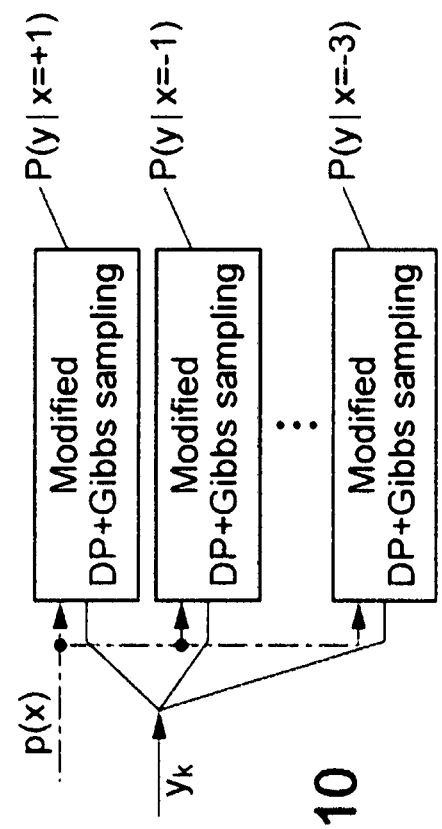
FIG. 10 shows an example of implementation of a modified Dirichlet process and Gibbs sampling for x belonging to {+1, −1, . . . , −3}, according to the embodiment of FIG. 9.

The second embodiment is given below, implementing a "tracking mode" with statistical knowledge. This mode is efficiently used after the first embodiment. The transmitted symbols x cannot be known in this embodiment, but, as presented on FIG. 9 below, the knowledge of $p_X(x)$ can still be used in order to evaluate (1) and is provided then to the estimator 13 (as well as the receiver 11 and the transmitter 10). In fact, there is no selection step done form the observed symbols. However, the M estimators are still computed and all consider any observed symbol as an input. The purpose of the bayesian inference is to weight the observed symbol according to the belief they correspond to a transmission of the symbol $x=\omega_m$ associated with the m-th estimator.

The main difference with the training mode is that the sent symbol x is unknown. However, the value of x can be inferred with a Bayesian approach, i.e., each observation y contributes to the update of $p_{Y|X}(y|x=\omega_m)$ with a weight corresponding to the probability of y being associated to $\omega_m$, from the current estimation on the condition probability distribution.

Details are given below regarding the second embodiment implementing the aforesaid tracking mode.

A clustering technique will be used. Let the cluster allocation labels be $s_i=j$ if $(\theta_j)$ belongs to the j-th cluster. Let $\rho_n=[s_1, \ldots, s_n]^T$ denote the vector of cluster allocation labels. Using the prediction in the Dirichlet Process (DP) by a covariate-dependent urn scheme, one obtains:

$$s_{n+1} | \rho_n, x_{1:n+1} \sim$$

$$\frac{\frac{\alpha}{\alpha+n} p(x_{n+1}=\omega_m)}{p(x_{n+1}=\omega_m | \rho_n, x_{1:n})} \delta_{k+1} + \sum_{j=1}^{k} \frac{\frac{n_j}{\alpha+n} p(x_{n+1}=\omega_m)}{p(x_{n+1}=\omega_m | \rho_n, x_{1:n})} \delta_j,$$

In order to update, for each estimator, the conditional probability distribution $p_{Y|X}(y|x=\omega_m)$ from the observed symbol, one can compute $$p(y_{n+1} | y_{1:n}, x_{1:n}, x_{n+1}=\omega_m) = \qquad (32)$$

$$\sum_{\rho_n} p(\rho_n | y_{1:n}, x_{1:n}, x_{n+1}=\omega_m)$$

$$\frac{\frac{\alpha}{\alpha+n} p(x_{n+1}=\omega_m)}{p(x_{n+1}=\omega_m | \rho_n, x_{1:n})} \zeta_{0,y}(y | x_{n+1}=\omega_m) +$$

$$\sum_{j=1}^{k} \frac{\frac{n_j}{\alpha+n} p(x_{n+1}=\omega_m)}{p(x_{n+1=\omega_m} | \rho_n, x_{1:n})} \zeta_{j,y}(y | x_{n+1}=\omega_m))$$

where $\zeta_{0,y}(y|x_{n+1}) = \int p(y|x_{n+1}, \theta) dP_0$, $\zeta_{j,y}(y|x_{n+1}) = p(y|x_{n+1}, x_j^*, y_j^*)$.

The clusters can then be updated similarly as in the first embodiment. Details of the principle of the prediction in the Dirichlet Process (DP) by a covariate-dependent urn scheme are given for example in document: "*Improving prediction from Dirichlet process mixtures via enrichment*", Sara K. Wade, David B. Dunson, Sonia Petrone, Lorenzo Trippa, Journal of Machine Learning Research (Nov. 15, 2013)

In the third embodiment, the symbols x are not assumed to belong to a finite alphabet. Thus, the bi-variate conditional probability $p_{Y|X}(y|x)$ must be learnt for all possible x values.

The conditional probability distribution estimation is based on an approximation of the channel probability distribution relying on a decomposition into a basis of probability distributions functions $g(y|x, \theta_j)$, where $\theta_j$ is a parameter set, in step S10. The distribution function is the exponential family and the parameters are essentially the mean and variance for the scalar case, and more generally the mean vector and covariance matrix for the multi-variate case. The conditional probability distribution estimator can find the best approximation of $p_{Y|X}(y|x)$ in the aforementioned basis $$p_{Y|X}(y|x) \cong \Sigma_{j=1}^{N} w_j g(y|x, \theta_j)$$

where N, and the sets $\{\theta_j\}$, $\{w_j\}$ are parameters to be estimated.

The solution is relying on the same algorithm as in the first embodiment, with the main following differences: there is only one estimator instead of M. The transmitter will transmit symbols x that are known at the receiver. The performance will be improved by using these transmitted symbols from a pseudo-random generator that will generate x values on a domain of interest, for example following a Gaussian distribution. By knowing the initial parameters of the pseudo-random generator, both the transmitter and receiver can know the x symbols.

The estimator is using a collapsed Gibbs sampling approach as in the first embodiment. In the present case, the collapsed Gibbs sampling of NEAL00 is used in a particular embodiment shown again in same FIG. 11 and is applied in the particular case for the estimator by:

In step S10, considering a base $g(y|x, \theta)$ to be from the exponential distribution family.
  This allows considering the prior on $\theta$ to be conjugate to the exponential distribution with the parameter $\lambda$. This is a mathematical trick that allows to have closed form expressions for the following steps.
  $\lambda=\{\lambda_2, \lambda_2\}$ denotes the hyperparameter for the conjugate prior on the parameter.

Here, step S11 corresponds now to a selection of the observed symbols {$y_n$} associated to the transmitted symbol {$x_n$}

The general step S12 can be decomposed again into:

In step S121, considering N clusters for the parameter sets {$\theta_j$}, {$w_j$}.

A cluster is used to group received symbols together. The clusters are implemented by associating an integer index from 1 to N for each group of symbols, as described below. This cluster assignment approach can be justified by the fact that each received symbol is more likely associated to one out of the N modes composing $p_{Y|X}(y|x)$ in (1)

The cluster assignment index for the i-th observed symbol is $c_i$.

Let $c_{-i}$ be the cluster assignment index for all clusters but the ith.

In step S122, computing the posterior distribution $p(c_i=k|y_{1:n}, x_{1:n}, c_{-i}, \lambda)$, where $y_{1:n}$ represents the input symbols of the received signal y. It can be shown that $$p(c_i=k|y_{1:n},x_{1:n},c_{-i},\lambda)=p(c_i=k|c_{-i})p(y_i|y_{1:i-1}, y_{i+1:n},x_{1:n},c_{-i},c_i=k,\lambda)$$

$p(c_i=k|c_{-i})$ is for example computed thanks to the Polya urn scheme $p(y_i|y_{1:i-1}, y_{i+1:n}, x_{1:n}, c_{-i}, c_i=k, \lambda)=\int p(y_i|x_i, \theta) p(\theta|y_{1:i-1}, y_{i+1:n}, x_{1:n}, c_{-i}, c_i=k, \lambda)d\theta$ which is computable because $p(y_i|x_i, \theta)$ follows the approximation $\sum_{j=1}^{N} w_j g(y|x, \theta_j)$ and $g(y|x, \theta)$ is from the exponential distribution family, which involves that the conjugate prior is known.

In step S123, sampling from the posterior distribution is performed in order to update the parameters {$\theta_m$}, {$w_m$}.

It is also preferable to check if a new cluster must be created. This is helpful to determine the best value of $N_m$ that provides the best approximation of the channel conditional probability distribution. This is done in step S124, by first starting a new cluster, which is defined as $$p(y_i|x,P_0)=\int p(y_i|x,\theta)dP_0,$$

where $P_0$ is the conjugate to the $p(y|x; \theta_j)$ (with parameter $\lambda$), which is computable since $p(y|x; \theta_j)$ is a weighted sum of $g(y|x, \theta_j)$ functions belonging to the exponential family. Then it is randomly chosen to create a new cluster from this probability. Therefore, it is randomly chosen to create a new cluster from a probability verifying that probability.

Details of use of Polya urn scheme can be obtained from document: "*Ferguson distributions via Polya urn schemes*", D. Blackwell and J. B. MacQueen, The Annals of Statistics, vol. 1, no. 2, pp. 353-355, 1973.

In a fourth embodiment related to a tracking mode related to the aforesaid second case, it is of interest to consider that the input does not belong to a finite alphabet and that the sent symbols are unknown. This mode is efficiently used after the third embodiment. The model for non-parametric joint density is defined as:

$$p_{Y,X}(y,x)=\sum_{j=1}^{N}w_j g(y|x,\theta_j)p(x|\psi_j). \tag{21}$$

The parameters {$\theta_j$}, {$w_j$}, and {$\psi_j$} denote the conditional density parameters that can be mean and covariance for the case of Gaussian density, magnitude, and the corresponding parameters for the input distribution, respectively. Generally speaking, the parameters ($\theta$, $\psi$) are jointly obtained from the base measure of Dirichlet Process "DP", i.e., ($\theta$, $\psi$)~$DP(\alpha P_{0\theta} \times P_{0\psi})$ where a is a scaling parameter.

The corresponding conditional probability density can be written in the following non-parametric form $$p_{Y|X}(y|x) = \frac{\sum_{j=1}^{\infty} w_j g(y|x, \theta_j)p(x|\psi_j)}{\sum_{j'=1}^{\infty} w_{j'}, p(x|\psi_{j'})} \tag{22}$$

$$= \sum_{j=1}^{\infty} w_j(x)g(y|x, \theta_j). \tag{23}$$

It is worth noting that in the prediction phase considering the fact that the placement of the particles is fixed and optimized from the training: the denominator in (22) and $p(x|\psi_j)$ act as scaling factors.

A clustering technique will be used. Let the cluster allocation labels be $s_i=j$ if ($\theta_i$, $\psi_i$) belongs to the j-th cluster. Let $\rho_n=[s_1, \ldots, s_n]^T$ denote the vector of cluster allocation labels. Using the prediction in DP by covariate-dependent urn scheme, one obtains:

$$s_{n+1}|\rho_n, x_{1:n+1} \sim \frac{w_{k+1}(x_{n+1})}{p(x_{n+1}|\rho_n, x_{1:n})}\delta_{k+1} + \sum_{j=1}^{k} \frac{w_j(x_{n+1})}{p(x_{n+1}|\rho_n, x_{1:n})}\delta_j, \tag{24}$$

where $$w_{k+1}(x_{n+1}) = \frac{\alpha \int p(x_{n+1}|\theta)dP_{0\theta}(\theta)}{\alpha + n}, \tag{25}$$

$$w_j(x_{n+1}) = \frac{n_j \int p(x_{n+1}|\psi)p(\psi|x_j^*)d\psi}{\alpha + n}, \tag{26}$$

in which $n_j$ is the number of subject indices in the j-th cluster.

It is further assumed that the set of particles is fixed, in the tracking phase of channel probability density estimation. This is a practical assumption as the location of the particles in the constellation are fixed in most of the practical applications. The notation $x_{n+1} \in x_{1:n}$ is used here to emphasize that the new signal is transmitted from the set of fixed constellation points that was used during the training. The estimated density $p(y|y_{1:n}, x_{1:n}, x_{n+1} \in x_{1:n})$ for the new received signal y is obtained as $$p(y|y_{1:n},x_{1:n},x_{n+1}\in x_{1:n})=\Sigma_{\rho_n}\Sigma_{s_{n+1}}p(y|y_{1:n},x_{1:n},x_{n+1}\Sigma x_{1:n}, \rho_n,s_{n+1})\times p(s_{n+1}|y_{1:n},x_{1:n},x_{n+1}\in x_{1:n},\rho_n)\times p(\rho_n|y_{1:n}, x_{1:n},x_{n+1}\in x_{1:n}), \tag{27}$$

where $\rho_n=[s_1, \ldots, s_n]^T$ denotes the vector of cluster allocation labels with $s_i=j$ if ($\theta_i$, $\psi_i$) belongs to the j-th cluster. Using (24), (27) can be simplified as $$p(y|y_{1:n}, x_{1:n}, x_{n+1}\in x_{1:n}) = \sum_{\rho_n} p(\rho_n|y_{1:n}, x_{1:n}, x_{n+1}\in x_{1:n}) \tag{28}$$

$$\left(\frac{w_{k+1}(x_{n+1})}{p(x_{n+1}|\rho_n, x_{1:n})}\zeta_{0,y}(y|x_{n+1}) + \sum_{j=1}^{k}\frac{w_j(x_{n+1})}{p(x_{n+1}|\rho_n, x_{1:n})}\zeta_{j,y}(y|x_{n+1})\right),$$

where k is the number of groups in the partition $\rho_n$, and $$\zeta_{0,y}(y|x_{n+1}) \triangleq \int p(y|x_{n+1},\theta)dP_{0\theta}(\theta), \tag{29}$$

$$\zeta_{j,y}(y|x_{n+1}) \triangleq \int p(y|x_{n+1},\psi)p(\psi|x_j^*,y_j^*)d\psi, \tag{30}$$

where $x_j^*$, $y_j^*$ denote the set of inputs and outputs for the j-th cluster. Consequently, the estimated conditional probability density is obtained according to equation (28).

After any of the above embodiments, an estimation of the conditional density probability function $p_{Y|X}(y|x)$ is obtained. In the two first embodiment, it is obtained for a fixed constellation of transmitted symbols x, while for the third and fourth embodiment, it is known as a bivariate function of y and x, and in particular for any values of x.

This knowledge of $p_{Y|X}(y|x)$ is used in the receiver in order to compute the likelihood of each received symbol y assuming a transmitted symbol x. This likelihood is required in the maximum likelihood decoding of transmitted symbols by selection the symbol x maximizing the likelihood for any received symbol x. This likelihood is also a component for computing Log-Likelihood Ratios provided at the input of a soft-input decoder, such as in:

J. Boutros, N. Gresset, L. Brunel and M. Fossorier, "*Soft-input soft-output lattice sphere decoder for linear channels*", *GLOBECOM '03. IEEE Global Telecommunications Conference* (IEEE Cat. No. 03CH37489), San Francisco, CA, 2003, pp. 1583-1587 vol. 3.

Thus, it is of interest for the receiver to know the estimation of $p_{Y|X}(y|x)$.

This invention can be advantageously used to provide a compact representation of $p_{Y|X}(y|x)$ through the parameters $\{w_j\}$ and $\{\theta_j\}$ as provided by the channel conditional probability distribution estimator to the receiver.

In another option, the knowledge of $p_{Y|X}(y|x)$ can be advantageously used at the transmitter in order to optimize the input distribution. Indeed, from the knowledge of a given distribution $p_X(x)$ which is in most applications discrete with fixed position of x and varying probabilities, the capacity of the channel characterized by $p_{Y|X}(y|x)$ with input $p_X(x)$ can be evaluated. Thus, the input distribution can be optimized.

In a first case of such optimization, the input distribution providing the highest capacity among a predefined set of input distributions is selected. Such a set is for example obtained by sampling Gaussian input distributions with different variance values. The sampling is for example performed for positions of x following a QAM (e.g. 256 QAM) constellation. In a second case of such optimization, the set is provided by several known constellation, such as QPSK, 16-QAM, 64-QAM, 256QAM, 8-PSK, 32-PSK, and so on. In a third case of such optimization, the position of the symbols x and their associated probability is chosen randomly and the best found random constellation is selected after each capacity computation.

In a last case of such optimization, it is advantageous to select the function $g(y|x, \theta_j)$ from an exponential families. Indeed, $p_{Y|X}(y|x)$ being the linear combination of such functions, it is possible to compute the derivative functions of $p_{Y|X}(y|x)$ for fixed values of x in a closed form. Thus, a gradient descent approach can be used in order to optimize the capacity with respect to the input distribution $p_X(x)$.

This invention can be advantageously used to provide a compact representation of $p_{Y|X}(y|x)$ through the parameters $\{w_j\}$ and $\{\theta_j\}$ as provided by the channel conditional probability distribution estimator to the transmitter.

The invention claimed is:

1. A method for optimizing a capacity of a communication channel in a communication system comprising at least a transmitter, a receiver, said communication channel—between the transmitter and the receiver, and a channel conditional probability distribution estimator;

the transmitter transmitting messages conveyed by a signal associated with a transmission probability according to an input signal probability distribution estimated by said estimator, the transmitter taking at least the messages as inputs and outputting the signal to be transmitted on the channel, said channel taking the transmitted signal as an input and outputting a received signal which is processed at the receiver in order to decode the transmitted message, said probability distribution being noted $p_{Y|X}(y|x)$ relating to an output Y, corresponding to the received signal, given an input X, corresponding to the transmitted signal X, and representing thus a channel conditional probability distribution of a probability of outputting a received signal Y, when the transmitted signal X is given, wherein the probability distribution is estimated as an approximation of the channel conditional probability distribution $p_{Y|X}(y|x)$ by using a functional basis of probability distributions, the channel conditional probability distribution being thus approximated, for each possible signal sent by the transmitter, by a mixture model with mixing probability distribution from said functional basis, the probability distribution for each possible transmitted signal being estimated from at least output signals received at the receiver, and using a collapsed Gibbs sampling relying on a Dirichlet process.

2. The method according to claim 1, wherein said functional basis is a family of exponential functions.

3. The method according to claim 2, wherein the probability distribution estimation is based on an approximation of the channel conditional probability distribution relying on a decomposition into a basis of probability distributions functions $g(y|x;\theta)$, where $\theta$ is a set of parameters $\theta_j$, said distribution function being the exponential family and the parameters are a mean and a variance, such that the approximation of $p_{Y|X}(y|x)$ in said basis of probability distributions functions $p(y|x; \theta)$ is given by $p_{Y|X}(y|x) \cong \sum_{j=1}^{N} w_j g(y|x;\theta_j)$, where N, and the sets $\{\theta_j\}, \{w_j\}$ are parameters to be estimated.

4. The method according to claim 3, wherein said probability distributions functions $g(y|x; \theta)$ being from the exponential distribution family, the prior on $\theta$ is conjugate to a corresponding exponential distribution with a parameter $\lambda$, with $\lambda=\{\lambda_1,\lambda_2\}$ denoting a hyperparameter for the conjugate prior on the parameter $\lambda$, And wherein:

N clusters are built for parameter sets $\{\theta_j\},\{w_j\}$, each cluster being used to group symbols together, the clusters being implemented by associating an integer index from 1 to N for each group of symbols, a cluster index is assigned for the i-th sample being noted $c_i$ so that $c_{-i}$ is a cluster assignment index for all clusters but the ith, a posterior distribution $p(c_i=k|x_{i:n},y_{1:n}, c_{-i}, \lambda)$ is computed where $x_{1:n}$ represents the symbols of the transmitted signal and $y_{1:n}$ represents the input symbols of the received signal, and a sampling from the posterior distribution is performed in order to update parameters $\{\theta_j\},\{w_j\}$, the parameters N, $\{\theta_j\}$, $\{w_j\}$ being thus estimated to provide the approximation of the channel conditional probability distribution $p_{Y|X}(y|x) \cong \sum_{j=1}^{N} w_j g(y|x; \theta_j)$.

5. The method according to claim 4, wherein the updated parameters $\{\theta_j\}$, $\{w_j\}$ are sent to the transmitter and/or to the receiver so as to compute said conditional probability distribution estimation.

6. The method according to claim 4, wherein the posterior distribution:

$$p(c_i=k|x_{1:n},y_{1:n},c_{-i},\lambda) \text{ is given by:}$$

$$p(c_i=k|x_{1:n},y_{1:n},c_{-i},\lambda)=p(c_i=k|c_{-i})p(y_i|x_{1:i-1},x_{i+1:n},y_{i:i-1},y_{i+i:n},c_{-i},c_i=k,\lambda),$$

where:
   $p(c_i=k|c_{-i})$ is computed according to a Polya urn scheme,
   and $(y_i|x_{1:i-1}, x_{i+1:n}, y_{1:i-1}, y_{i+1:n}, c_{-i}, c_i=k, \lambda) = \int p(y_i|x_i,\theta)p(\theta|x_{1:i-1}, x_{i+1:n}, y_{1:i-1}, y_{i+1:n}, c_{-i}, c_i=k, \lambda)d\theta$.

7. The method of claim 6, wherein it is furthermore checked whether a new cluster is to be created so as to determine a best value of parameter N, providing an optimum approximation of the channel conditional probability distribution.

8. The method of claim 7, wherein it is randomly chosen to create a new cluster from a probability verifying:

$p(y_i|x_i;P_0) = \int p(y_i|x_i;\theta)dP_0$, where $P_0$ is the conjugate to $p(y|x;\theta)$.

9. The method according to claim 1, applied for only one predefined value of the input X, and wherein the input X is known and the associated output Y, in a training mode, is considered only when the input X equals said predefined value.

10. The method according to claim 1, wherein, in a tracking mode, an input signal probability distribution $p_X(x)$ is taken into account for the channel conditional probability distribution estimation, a value of a transmitted symbol x being inferred with a Bayesian approach so that each observation y contributes to an update of $p_{Y|X}(y|x)$ with a weight corresponding to the probability of y being associated to x, from a current estimation on the condition probability distribution.

11. The method of claim 10, wherein a model for nonparametric joint density is defined as:

$p(y,x) = \sum_{j=1}^{N} w_j g(y|x,\theta_j) p(x|\psi_j)$ where parameters $\{\theta_j\}$, $\{w_j\}$, and $\{\psi_j\}$ denote conditional density parameters, and j being a cluster index, the parameters $(\theta, \psi)$ being jointly obtained from a base measure of Dirichlet Process "DP" such that $(\theta, \psi) \sim DP(\alpha P_{0\theta} \times P_{0\psi})$ where $\alpha$ is a scaling parameter.

12. The method according to claim 1, wherein, a set of signals being represented by a set of respective symbols is configured to be transmitted by the transmitter to the channel, parameters of said mixture model are optimized for defining optimized symbols positions and probabilities to be used at the transmitter, in order to optimize the capacity of the approximated channel, the optimized symbols positions and probabilities being then provided to the transmitter and/or to the receiver.

13. A system comprising at least a transmitter, a receiver, a communication channel between the transmitter and the receiver, and a channel conditional probability distribution estimator for implementing the method as claimed in claim 1, wherein the estimator:
   Obtains information relative to the transmitted signal (x; $p_X(x)$) used at the transmitter;
   Receives a signal y transmitted through the channel and characterized by a channel conditional probability distribution $p_{Y|X}(y|x)$;
   Estimates a channel conditional probability distribution from the received signal, the channel conditional probability distribution being approximated by a model of distributions relying on a basis of functions;
   Sends the estimated channel conditional probability distribution to the receiver and/or to the transmitter.

14. The system of claim 13, further comprising an input signal probability distribution optimizer for performing the method: wherein a set of signals being represented by a set of respective symbols is configured to be transmitted by the transmitter to the channel, parameters of said mixture model are optimized for defining optimized symbols positions and probabilities to be used at the transmitter, in order to optimize the capacity of the approximated channel, the optimized symbols positions and probabilities being then provided to the transmitter and/or to the receiver, and wherein the input signal distribution optimizer:
   Obtains the estimated channel conditional probability distribution $p_{Y|X}(y|x)$
   Optimizes an input signal distribution $p_X(x)$,
   Sends the optimized input signal distribution to the transmitter and/or to the receiver, and to the channel conditional probability distribution estimator.

\* \* \* \* \*